United States Patent
Christie et al.

(10) Patent No.: US 8,843,553 B2
(45) Date of Patent: Sep. 23, 2014

(54) METHOD AND SYSTEM FOR COMMUNICATION WITH VEHICLES

(75) Inventors: Cameron Christie, Palo Alto, CA (US); Yuval Appelboum, Thousand Oaks, CA (US); Gantimur Meissner, Berlin (DE)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 665 days.

(21) Appl. No.: 12/636,836

(22) Filed: Dec. 14, 2009

(65) Prior Publication Data

US 2011/0145331 A1    Jun. 16, 2011

(51) Int. Cl.
*G06F 15/16* (2006.01)
*H04W 8/00* (2009.01)
*G08G 1/16* (2006.01)
*H04M 1/60* (2006.01)

(52) U.S. Cl.
CPC ............ *H04W 8/005* (2013.01); *H04M 1/6091* (2013.01); *H04M 2250/02* (2013.01); *G08G 1/161* (2013.01)
USPC .......................................................... 709/204

(58) Field of Classification Search
USPC ......................................................... 709/206
See application file for complete search history.

(56) References Cited

U.S. PATENT DOCUMENTS

| 6,959,166 | B1 | 10/2005 | Gabai et al. ................... 434/308 |
| 2006/0059229 | A1* | 3/2006 | Bain et al. ...................... 709/205 |
| 2006/0149428 | A1 | 7/2006 | Kim et al. ......................... 701/1 |
| 2007/0118739 | A1* | 5/2007 | Togashi et al. ................ 713/158 |
| 2007/0162550 | A1* | 7/2007 | Rosenberg .................... 709/206 |
| 2008/0119994 | A1 | 5/2008 | Kameyama ..................... 701/48 |
| 2008/0172458 | A1 | 7/2008 | Middleton et al. ............ 709/203 |
| 2009/0170434 | A1 | 7/2009 | Tengler et al. ................ 455/41.2 |

FOREIGN PATENT DOCUMENTS

| DE | 102005058227 | 7/2006 | ............. B60R 16/02 |
| DE | 102007053470 | 5/2008 | ............. B60R 16/02 |
| DE | 102007037073 | 2/2009 | ............. B60K 35/00 |

* cited by examiner

*Primary Examiner* — Brian P Whipple
(74) *Attorney, Agent, or Firm* — King & Spalding L.L.P.

(57) ABSTRACT

In a method and a system for communicating between motor vehicles, the method provides for a repeated sending of an initialization message by a first transceiver arranged in a first motor vehicle, wherein the initialization message includes an identification code of the first transceiver and its geographic position.

21 Claims, 7 Drawing Sheets

METHOD AND SYSTEM FOR COMMUNICATION WITH VEHICLES

TECHNICAL FIELD

The invention relates to a method and a system for communicating between and with motor vehicles, respectively.

BACKGROUND

An average person spends a lot of time in his/her vehicle and motor vehicle, respectively, in order to drive around in the local community, for example in order to drive to work, to school, for shopping or to attend social meetings. In big cities these individuals are often isolated from social contacts although they are surrounded by other drivers on highways and at intersections. At home some drivers spend precious free time by searching for likeminded individuals in social networking websites. Although many people establish contact with other people which they have met online, these people often live in different federal states or other countries which renders it difficult to establish a relationship.

There are people who already use their vehicle to express their personality. This way, via the car which one is driving or which individual modifications have been carried out thereon it is possible to express his/her personality. This way, cars are already similar to a personal profile in social networking websites. There is, however, no possibility to establish a contact with likeminded drivers on the road.

US 2008/0172458 A1 discloses a system and a method, respectively, for data based connecting of a wireless device with a plurality of Internet services including so called Social Networking Web Services. Such a system may comprise a so called Web Server Proxy which comprises an API which allows other modules a data based connection to the Web Server Proxy.

US 2009/0170434 A1 discloses a method for transmitting information which has been formatted for a Internet publication of a first vehicle by means of a short range wireless communication connection which allows for communicating with a second vehicle. Thereby it is provided that a so called Webpage for Internet publication is stored in the first vehicle in a formatted manner. Furthermore, an initiation signal is transmitted to the second vehicle. In addition, by means of components for short range wireless communication a communications connection is established between the first and the second vehicle. If authorized by the second vehicle the information formatted for Internet publication may be transferred.

DE 10 2007 037 073 A1 discloses a device for communicating information to the driver of a motor vehicle, wherein a control device and a pointing device controlled by the control device is provided which is formed as a humanoid figure. DE 10 2007 053 470 A1 and US 2008/0119994 A1 disclose a vehicle user assist system for detecting a condition of a user and for controlling operations of vehicle devices in a manner desirable for the user. DE 10 2005 058 227 A1 and US 2006/0149428 A1 disclose an emotion based software robot for automobiles. WO 99/54015 and U.S. Pat. No. 6,959,166 B1 disclose a toy comprising an unusual physical appearance.

SUMMARY

According to various embodiments, social networking can be improved, simplified and promoted. According to further embodiments, a communication between otherwise unknown vehicles can be established. According to yet another embodiment, vehicle to vehicle communication can be improved.

According to an embodiment, a method for communicating with motor vehicles may comprise the step of repeatedly sending an initialization message by means of a first transceiver arranged in a first motor vehicle, wherein the initialization message comprises an identification code of the first transceiver and its geographic position.

According to a further embodiment, the method may further comprise the step of outputting an information message in a second motor vehicle, wherein the information message specifies that an initialization message of the transceiver arranged in the first motor vehicle first has been received. According to a further embodiment, the method may further comprise the step of outputting a position information in the second motor vehicle, wherein the position information specifies the position of the first transceiver. According to a further embodiment, the method may further comprise the step of offering an input function for sending a friendship request. According to a further embodiment, the method may further comprise the step of sending the friendship request. According to a further embodiment, the method may further comprise the step of outputting a position information in a second motor vehicle at reception of the initialization message of the first transceiver arranged in the first motor vehicle by of a second transceiver arranged in the second motor vehicle, wherein the position information specifies the position of the first transceiver. According to a further embodiment, the method may further comprise the step of sending a friendship request from the second transceiver to the first transceiver. According to a further embodiment, the method may further comprise the step of offering an input function in the second motor vehicle for sending a friendship request from the second transceiver to the first transceiver. According to a further embodiment, the method may further comprise the step of sending a friendship request from the second transceiver to the first transceiver. According to a further embodiment, the method may further comprise the step of receiving the friendship request by the first transceiver. According to a further embodiment, the method may further comprise the step of accepting the friendship request. According to a further embodiment, the method may further comprise the step of accessing a personal data profile dedicated to the second transceiver. According to a further embodiment, the method may further comprise the step of accessing a personal data profile dedicated to the first transceiver. According to a further embodiment, the method may further comprise the step of receiving the friendship request. According to a further embodiment, the method may further comprise the step of accepting the friendship request. According to a further embodiment, the method may further comprise the step of accessing a personal data profile dedicated to the second transceiver. According to a further embodiment, the method may further comprise the step of receiving the friendship request by the first transceiver. According to a further embodiment, the method may further comprise the step of accepting the friendship request. According to a further embodiment, the method may further comprise the step of accessing a personal data profile dedicated to the second transceiver.

According to another embodiment, a system for communicating with motor vehicles may comprise a first transceiver arranged in a first motor vehicle for repeated sending of an initialization message, wherein the initialization message comprises an identification code of the first transceiver and its geographic position; a second transceiver arranged in a second motor vehicle; and a human-machine interface dedicated to the second motor vehicle for outputting an information message in a second motor vehicle, wherein the information message specifies that an initialization message of the first transceiver arranged in the first motor vehicle has been received.

According to a further embodiment, the human-machine interface can be formed for outputting a position information, wherein the position information specifies the position of the first transceiver. According to a further embodiment, the human-machine interface can be formed for outputting an input function for sending a friendship request from the second transceiver to the first transceiver.

DETAILED DESCRIPTION

According to various embodiments as stated above, in a method for communicating between motor vehicles, by means of a first transceiver arranged in a first motor vehicle an initialization message is sent repeatedly, and the initialization message comprises an identification code of the first transceiver and its geographic position and the geographic position of the first motor vehicle, respectively.

A transceiver in the sense of the invention in particular is a transmitting and receiving device. A transceiver arranged in a motor vehicle in particular in the sense of the invention is not integral with the motor vehicle, but is detachably locked in place and/or mounted therein. A transceiver in the sense of the invention may be integrated into a three-dimensional corporal figure, in particular into a three-dimensional corporal figure for communicating with the passengers in the motor vehicle. A three-dimensional corporal figure in the sense of the invention in particular is an avatar. In particular it is to be provided, that the figure and the avatar are to be comprehended synonymously. A three-dimensional corporal figure in the sense of the invention in particular has a particularly lens-shaped rounded housing. A three-dimensional corporal figure in the sense of the invention in particular has at least one pedestal.

In particular it may be provided for that a three-dimensional corporal figure in the sense of the invention has a loudspeaker, a microphone, a data interface to a motor vehicle, a wireless communication interface, a positioning system, an acceleration sensor and/or a navigation system. In particular it is provided for that by means of a control of the three-dimensional corporal figure speech outputs may be carried out via a loudspeaker of the three-dimensional corporal figure. In particular these are carried out in a coordinated manner using an activation of a display of the three-dimensional corporal figure, so that it is in particular provided for that a mimic or a facial expression displayed by means of the display of the three-dimensional corporal figure corresponds with a speech output which is output by means of the loudspeakers of the three-dimensional corporal figure.

It may be provided for that by means of a three-dimensional corporal figure in the sense of the invention output signals of one or more acceleration sensors may be used to identify and to classify, respectively, the driving behaviour, to detect strong braking actions or acceleration actions, to determine the road surface characteristics or the lateral acceleration forces in curves and in particular to comment these.

A three-dimensional corporal figure in the sense of the invention in particular may comprise a temperature sensor, a humidity sensor, a brightness sensor as well a as further sensors, if applicable. Temperature, humidity and light sensors may for example be used to determine actual weather and driving conditions. A three-dimensional corporal figure in the sense of the invention may comprise a Bluetooth interface and/or a connection to a CAN-Bus located in the motor vehicle. By means of the Bluetooth interface a communication with mobile phones or other mobile devices may be established.

A three-dimensional corporal figure in the sense of the invention may comprise algorithms and learning algorithms, respectively, which allow to detect actions of the motor vehicle, the destination of a trip, the mental state of a driver and the like. For detecting the actual state of the driver for example a system may be provided as disclosed in DE 10 2007 053 470 A1 and US 2008/0119994 A (incorporated by reference).

In particular it may be provided for that a three-dimensional corporal figure in the sense of the invention comprises a selectable personality. Thereby, in particular it may be provided for that the personality may be configured by means of a computer. When, for example, the three-dimensional corporal figure is programmed such that it comprises a serene personality it may be provided for that it tells jokes and anecdotes if the motor vehicle is caught in a traffic jam or is delayed. When the three-dimensional corporal figure is provided with and configured accordingly, respectively, with an informative personality it may be provided for that it outputs security proposals based on the driving behaviour or recommendations how the fuel efficiency could be improved. In particular it may be provided for that the activities of the three-dimensional corporal figure may be stopped by an acoustic command such as for example "be quiet" and "go to sleep".

In a further embodiment it is provided for that the figure comprises a touch-sensitive area for detecting a contact to the figure. In a further embodiment the touch-sensitive area is arranged in an upper area of the figure. In a further embodiment the touch-sensitive area at least is arranged at the highest position of the figure. The reference "upper and lower" results form the corporal embodiment of the three-dimensional figure and its intended orientation and arrangement, respectively, in a motor vehicle. An upper area of the three-dimensional corporal figure in particular comprises the upper half of the three-dimensional corporal figure. The highest point in the sense of the invention relates to the highest point of the three-dimensional corporal figure at its intended orientation and arrangement, respectively, in a motor vehicle. In particular it is provided for that the touch-sensitive area acts together with control in order to identify stroking, rubbing or certain gestures.

In a further embodiment the figure does not comprise (autonomously) movable extremities.

In a further embodiment the figure has a height which is less than the width of the figure. The height of the three-dimensional corporal figure in the sense of the invention in particular is its vertical extension at the intended orientation and arrangement, respectively, in motor vehicles. The width of the three-dimensional corporal figure in the sense of the invention in particular is its maximum horizontal extension at the intended orientation and arrangement, respectively, in a motor vehicle. The height of the three-dimensional corporal figure in particular relates to a direction/orientation which is orthogonal in relation to the direction/orientation to which the width of the three-dimensional corporal figure relates. In a further embodiment the width of the figure is 1.5 times to 3 times the height of the figure.

In a further embodiment the figure in addition comprises a display and a control for displaying variable facial expressions on the display.

In particular it is provided for that a communication of a passenger and a driver, respectively, of a motor vehicle with the three-dimensional corporal figure is carried out acoustically and/or haptic and that a communication from the three-dimensional corporal figure to a driver or passenger of the motor vehicle is carried out optically and/or acoustically.

A repeated sending of an initialization message in particular comprises a periodic sending and at least a plurality of sending actions, respectively, of the initialization message.

In an embodiment in addition and subsequently, respectively, a for example optical and/or acoustic output of an information message is carried out in a second motor vehicle, wherein the information message indicates that an initialization message of the first transceiver arranged in the first motor vehicle has been received. In a further embodiment in addition and subsequently, respectively, an in particular optical output of a position information is carried out in the second motor vehicle, wherein the position information indicates the position of the first motor vehicle and of the first transceiver, respectively. An optical output of a position information in a motor vehicle may in particular be carried out by means of a map display and/or in particular by a photographic representation of the vicinity of the motor vehicle. An optical output of a position information in a motor vehicle may, however, also be carried out in the form of a direction arrow and a direction information, respectively.

In a further embodiment in addition and subsequently, respectively, (in particular in the second motor vehicle) a in particular optical offering of an input function for sending a friendship request (in particular from the second transceiver to the first transceiver) is carried out. Providing an input function in the sense of the invention may for example be carried out optically by means of representing an operating element below a touch-screen and/or by means of the representation of the function of a softkeys. Providing an input function, however, may also be carried out acoustically, for example by asking a question which may be answered with Yes or No. In a further embodiment in addition and subsequently, respectively, a sending of the friendship request (in particular from the second transceiver to the first transceiver) is carried out.

In a further embodiment in addition and subsequently, respectively, when receiving the initialization message of the first transceiver arranged in the first motor vehicle an output of a position information (in particular in a second motor vehicle) is carried out by means of a second transceiver arranged in the second motor vehicle, wherein the position information indicates the position of the first motor vehicle and of the first transceiver, respectively. In a further embodiment in addition and subsequently, respectively, a sending of a friendship request (in particular from the second transceiver to the first transceiver) is carried out. The position information may for example be carried out in the form of an entry into a map or using a photographic representation of a vicinity of the motor vehicle or in the form of a direction information.

In a further embodiment in addition and subsequently, respectively, (in particular in the second motor vehicle) an offering of an input function for sending a friendship request (in particular from the second transceiver to the first transceiver) is carried out.

In a further embodiment in addition and subsequently, respectively, the friendship request (in particular by the first transceiver) is received. In a further embodiment in addition and subsequently, respectively, an accepting of the friendship request is carried out. In a further embodiment in addition and subsequently, respectively, an access to a personal data profile related to the second transceiver and/or an access to a personal data profile related to the first transceiver is carried out.

Accessing a personal data profile thereby in particular is carried out via the Internet. In doing so, in particular a certain web service or web server is provided at which a user has deposited his/her personal data profile in advance. A personal data profile such deposited in particular (at least in part) is a typical profile as for example deposited at Twitter or Facebook. A personal data profile in the sense of the invention may for example comprise name, sex, age, preferences, occupation, interests and/or hobbies and so forth.

Prior to being able to use the transceiver it is in particular provided for that it is initialized at first. To do so, a personal data profile in particular is established and deposited, respectively, at a suitable web service, wherein the profile subsequently may be retrieved accordingly by another user with which a contact has been established.

The aforementioned goal in addition is reached by means of a system for communicating between and with motor vehicles, respectively, in particular being operable according to a method according to one or several of the aforementioned objects, wherein the system comprises a first transceiver arranged in a first motor vehicle for repeated sending of an initialization message, wherein the initialization message comprises an identification code of the first transceiver and its geographic position, wherein the system for communicating between motor vehicles comprises a second transceiver arranged in a second motor vehicle, and wherein a human-machine interface dedicated to the second motor vehicle for outputting an information message in a second motor vehicle is provided, wherein the information message indicates that an initialization message of the first transceiver arranged in the first motor vehicle has been received.

In an embodiment the human-machine interface for outputting a position information is embodied, wherein the position information indicates the position of the first motor vehicle and of the first transceiver, respectively. The human-machine interface may be arranged in the three-dimensional corporal figure or in the motor vehicle. In particular it is provided for that a display device serves as a human-machine interface in the aforementioned sense which is integral with the motor vehicle. An exemplary embodiment for such a display device for example is the display and operating device 104 depicted in FIG. 2.

In a further embodiment the human-machine interface is arranged for outputting an input function for sending a friendship request from the second transceiver to the first transceiver. The human-machine interface may be arranged in the three-dimensional corporal figure or in the motor vehicle. In particular it is provided for that a display device serves as the human-machine interface in the aforementioned sense which is integrated in the motor vehicle. An exemplary embodiment of such a display device for example is the display and operating device 104 depicted in FIG. 2.

A motor vehicle in the sense of the invention in particular is a land craft for individual use in road traffic. Motor vehicles in the sense of the invention in particular are not limited to land crafts comprising an internal combustion engine.

Further advantages and details result from the following description of exemplary embodiments.

Figure 1:
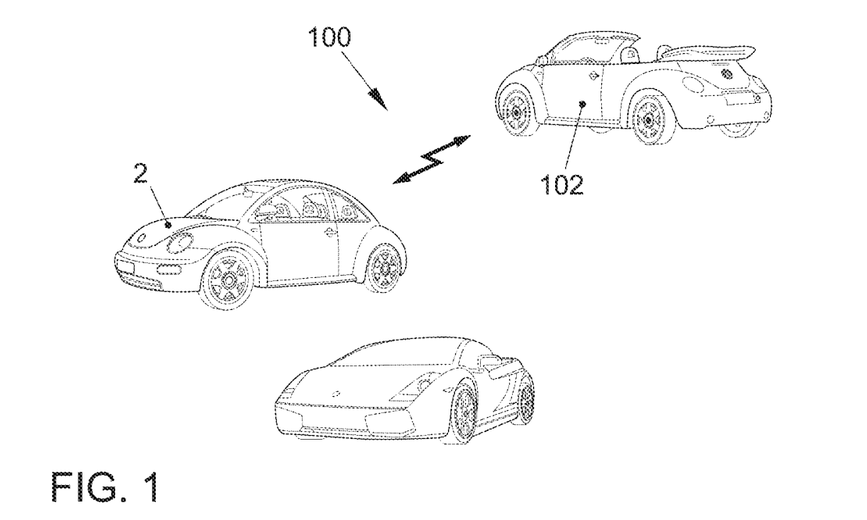
FIG. 1 shows an exemplary embodiment of a system for communicating between motor vehicles.
Figure 2:
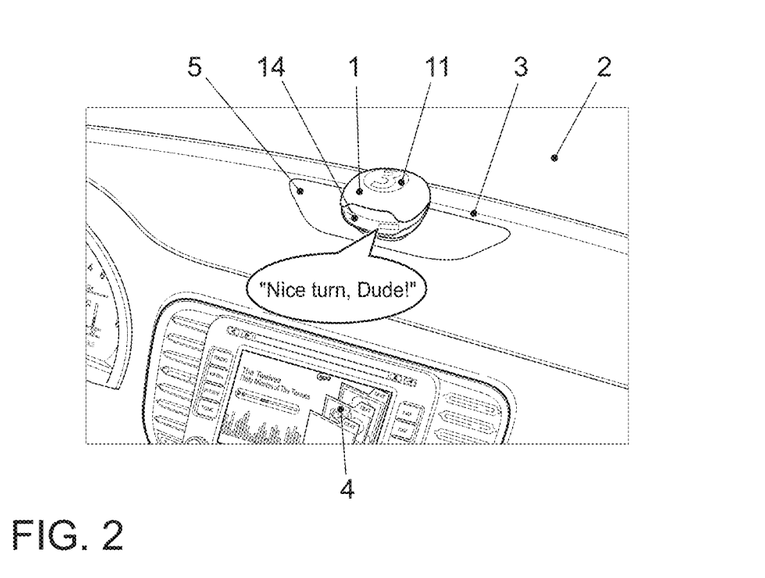
FIG. 2 shows an exemplary embodiment of a partial inside view of a motor vehicle comprising a three-dimensional corporal figure locked in place therein.

FIG. 1 shows an exemplary embodiment of a system 100 for communicating between and with, respectively, motor vehicles 2 and 102. For this purpose, the participating motor vehicles 2 and 102 comprise a transceiver arranged in a three-dimensional corporal FIG. 1 as is depicted by way of example with respect to the motor vehicle 2 in FIG. 2. Thereby, FIG. 2 shows an exemplary embodiment of a motor vehicle 2 in a partial inside view. Thereby, reference numeral 4 indicates a display and operating device of the motor vehicle 2. Provided above the display and operating device 4 of the motor vehicle 2 and on the dashboard 3 is a clamping device 5 in which the three-dimensional corporal FIG. 1 is locked in place detachably.

Figure 3:
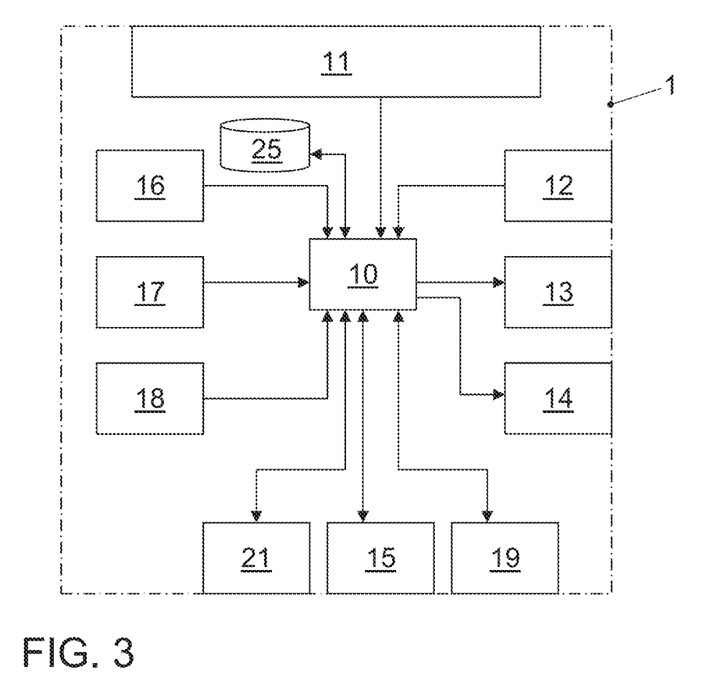
FIG. 3 shows a functional schematic diagram of a three-dimensional corporal figure depicted in FIG. 2.

FIG. 3 shows the three-dimensional corporal FIG. 1 in a functional schematic diagram. The three-dimensional corporal FIG. 1, subsequently also denominated as FIG. 1, comprises a control 10 and—in the upper part of FIG. 1—a touch-sensitive area 11 for analyzing touches to the touch-sensitive area 11. By means of the touch-sensitive area 11 a user, for example a driver of the motor vehicle 2, may interact with the three-dimensional corporal FIG. 1. The three-dimensional corporal FIG. 1 in addition comprises a microphone 12, a loudspeaker 13 and a display 14 by means of which in coaction with the control 10 in particular different facial expressions for communicating with a passenger and a driver, respectively, of the motor vehicle 2 may be created. Examples for different facial expressions are for example shown in FIG. 2, FIG. 4, FIG. 6 and FIG. 9.

FIG. 1 in addition comprises one or several acceleration sensors 16, optionally a positioning system 17 and further sensors 18. In addition a USB interface 19 is provided by means of which the energy supply and a charging of a electrical energy storage (not shown) of the three-dimensional corporal FIG. 1, respectively, is carried out. Furthermore the three-dimensional corporal FIG. 1 comprises a wireless interface 15, which for example may be designed as a Bluetooth interface. By means of the Bluetooth interface 15 a communication may be carried out with the motor vehicle 2 or other mobile devices. Furthermore, an interface 21 is provided by means of which it may be communicated in a wireless manner with other figures which are formed according to the three-dimensional corporal FIG. 1. The interface 21 and the connection consisting of interface 21 and control 10, respectively, form an exemplary embodiment for a transceiver in the sense of the claims.

In addition, the three-dimensional corporal FIG. 1 comprises a memory 25 in which an individual identification code of the three-dimensional corporal FIG. 1 and of the corresponding transceiver of the three-dimensional corporal FIG. 1, respectively, is stored. The memory 25 may also be integrated into the control 10.

Figure 4:
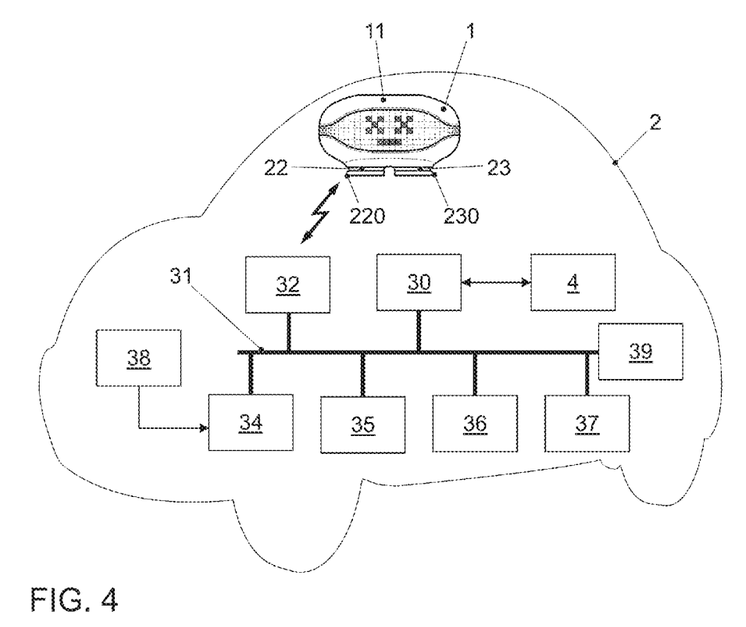
FIG. 4 shows the motor vehicle according to FIG. 2 in an exemplary functional schematic diagram.

The three-dimensional corporal FIG. 1—as can be seen in FIG. 4—is flattened in its upper portion in which the touch-sensitive area 11 is provided. Furthermore, the three-dimensional corporal FIG. 1 comprises two pedestals 22 and 23 for clamping the three-dimensional corporal FIG. 1 in the clamping device 5 of the motor vehicle 2. For this purpose, each pedestal 22 and 23 comprises a salient 220, 230.

FIG. 4 shows the motor vehicle 2 in an exemplary schematic diagram. The motor vehicle 2 amongst other things comprises a display and operating control 30, by means of which the display and operating device 4 may be activated and is coupled with a bus system 31. By means of the display and operating device 4 and the display and operating control 30, respectively, for example a navigation system 35 of the motor vehicle 2, an automatic climate control 36 of the motor vehicle 2 and an infotainment system 37 of the motor vehicle 2 may be operated.

Reference numeral 34 indicates a vehicle control by means of which for example sensors 38 located in the vehicle may be analyzed. The sensors 38 located in the vehicle may for example be sensors for an ASP system, an ASR system or an ESP system or a steering angle sensor. Furthermore the motor vehicle 2 comprises an interface 22 by means of which—in particular by means of the interface 15—a wireless communication with the three-dimensional corporal FIG. 1 may be carried out. The sensors 38 located in the vehicle and the combination of sensors 38 located in the vehicle and the vehicle control 34 represent an exemplary embodiment of sensors for measuring operating conditions of a motor vehicle in the sense of the claims.

Reference numeral 39 indicates a camera for recording the vicinity of the motor vehicle 2. The camera 39 likewise is connected to the bus system 31 so that by means of the display and operating control 30 an image of the camera 39 may be displayed on a display of the display and operating device 4.

Figure 5:
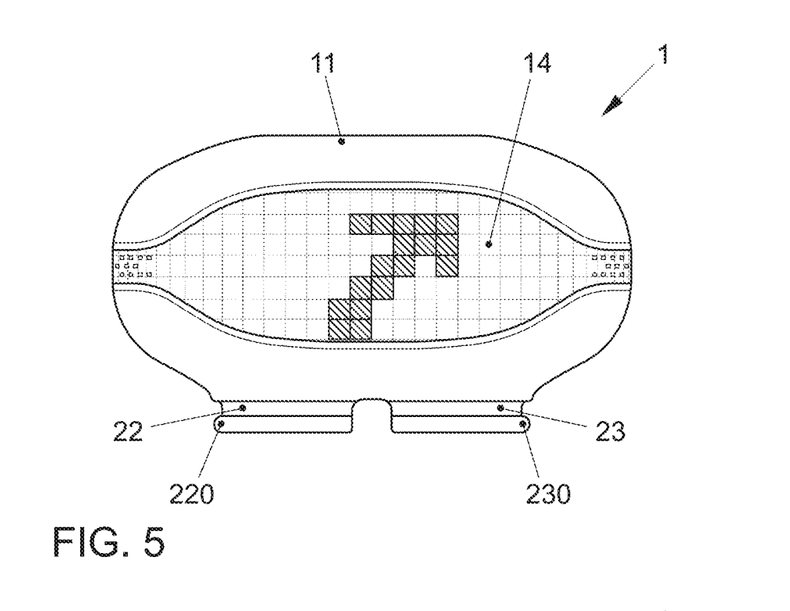
FIG. 5 shows an exemplary embodiment of a three-dimensional corporal figure according to FIG. 2 during the representation of a direction arrow.
Figure 6:
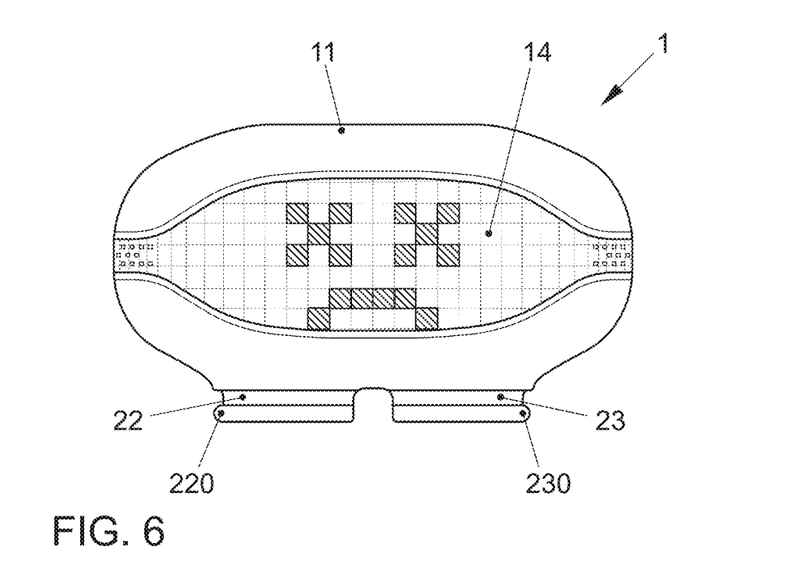
FIG. 6 shows an exemplary embodiment of a three-dimensional corporal figure according to FIG. 2 during the representation of a disapproval.

It is in particular provided for that by means of the control 10 speech outputs may be carried out via the loudspeaker 13. These in particular are carried out in a coordinated manner together with an activation of the display 14 so that it is provided for in particular that a mimic or a facial expression displayed by means of the display 14 corresponds with a speech output which is output by means of the loudspeaker 13. If for example the speech output "Five more minutes to go" is carried out by means of the loudspeaker 13 then a direction arrow in the direction auf the destination is displayed by means of the display 14 as depicted in FIG. 5 as an example. If for example the speech output "We are 20 MPH over speed-limit. You are making me nervous!" is carried out by means of the loudspeaker 13 then a facial expression expressing disapproval is displayed by means of the display 14 as depicted in FIG. 6 as an example. For this purpose it is provided for in the present exemplary embodiment that the corners of the mouth of the facial expression are drawn downward.

Figure 7:
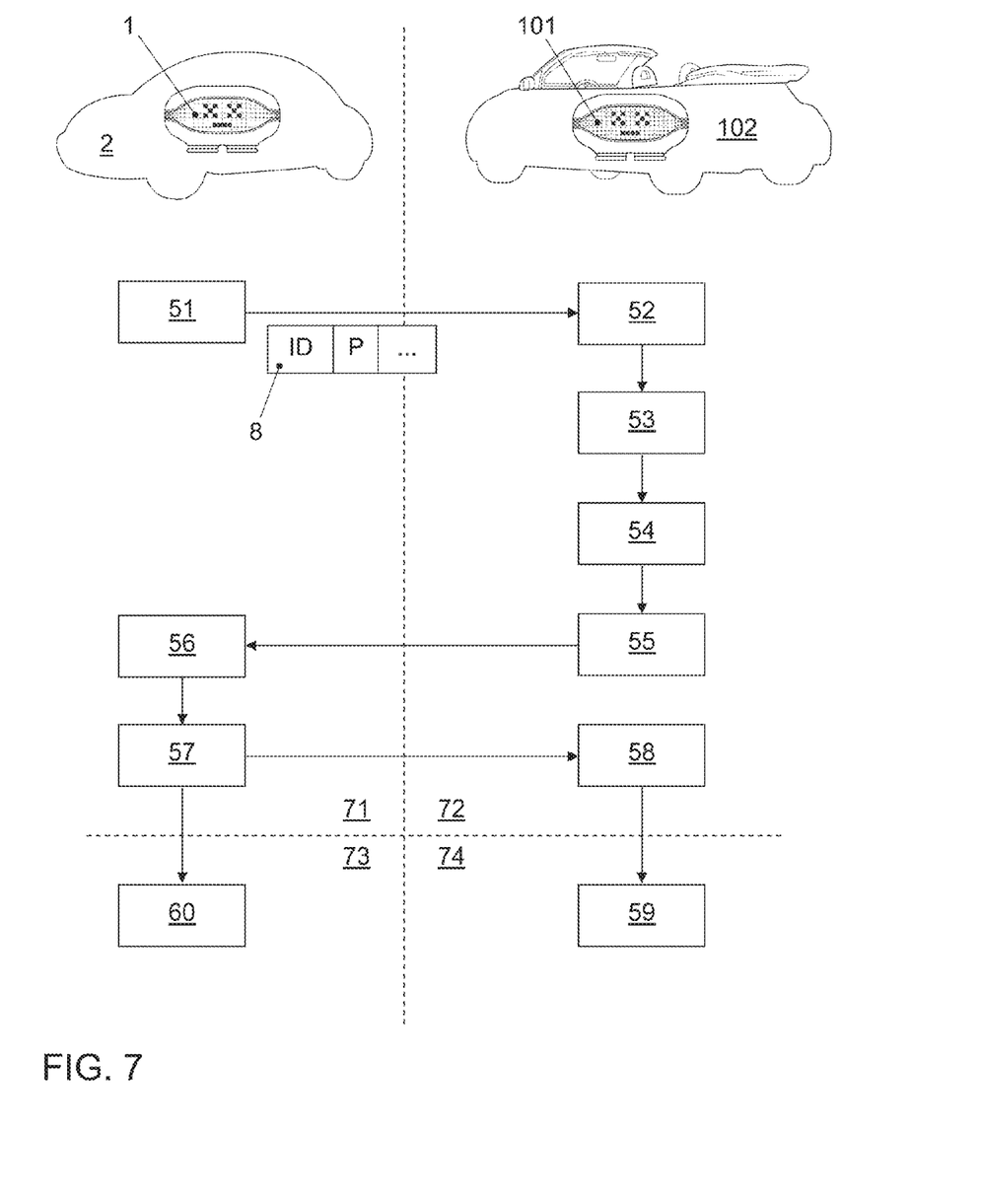
FIG. 7 shows an exemplary embodiment of a method for communicating with and between motor vehicles, respectively.

FIG. 7 shows an exemplary embodiment of a method for communicating with and between motor vehicles, respectively, using the example of the motor vehicles 2 and 102 and of the transceiver integrated into the three-dimensional corporal FIG. 1, respectively, wherein the three-dimensional corporal FIG. 1 is arranged in the motor vehicle 2 and a transceiver arranged in a three-dimensional corporal FIG. 101, wherein the three-dimensional corporal FIG. 101 is arranged in the motor vehicle 102.

Method steps executed in the motor vehicle 2 and corresponding to the transceiver integrated in the three-dimensional corporal FIG. 1, respectively, are depicted in a quadrant indicated by reference numeral 71. Method steps executed in the motor vehicle 102 and corresponding to the transceiver integrated in the three-dimensional corporal FIG. 101, respectively, are depicted in a quadrant indicated by reference numeral 72. Method steps and actions, respectively, corresponding to the transceiver integrated in the three-dimensional corporal FIG. 1 which, however, optionally in particular are carried out in the motor vehicle 2 or at a later time, possibly at home, are allocated to a quadrant indicated by reference numeral 73. Method steps and actions, respectively, corresponding to the transceiver integrated in the three-dimensional corporal FIG. 101 which, however, optionally in particular are carried out in the motor vehicle 102 or at a later time, possibly at home, are allocated to a quadrant indicated by reference numeral 74.

The method starts with a step 51 in which a transceiver of the three-dimensional corporal FIG. 1 and allocated to the motor vehicle 2, respectively, repeatedly sends an initialization message 8, wherein the initialization 8 comprises an identification code ID of the transceiver and its geographic position P. Die geographic position P may for example be determined by means of the optionally provided navigation system 17 and/or by means of the navigation system 35 of the motor vehicle.

Figure 8:
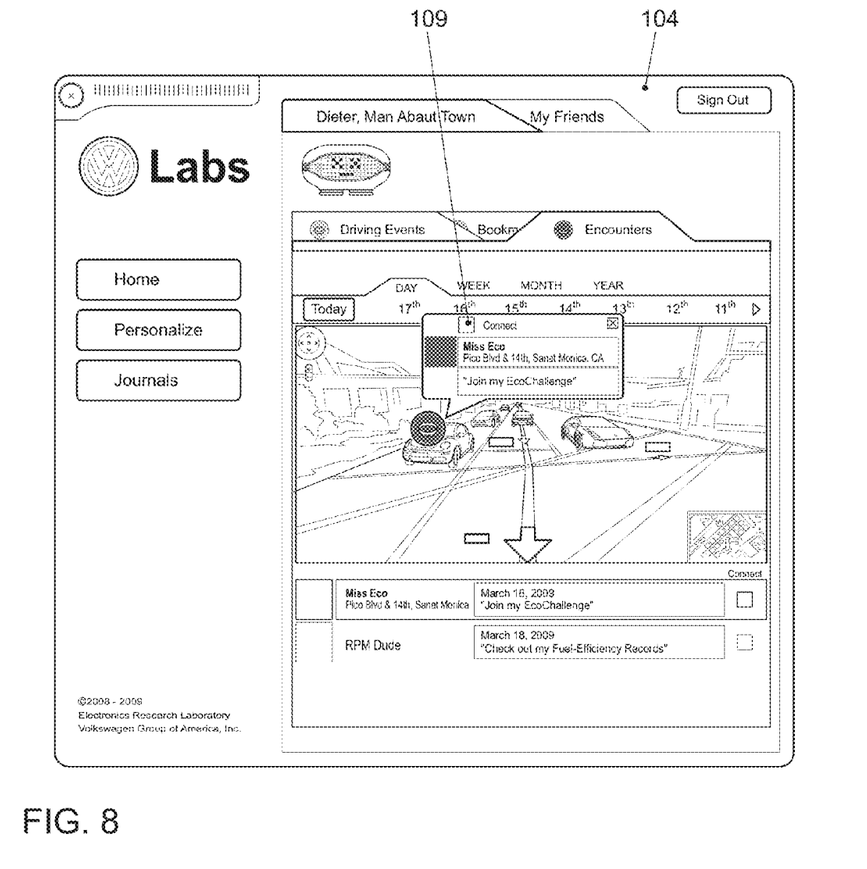
FIG. 8 shows an exemplary embodiment for outputting a position information.

If the initialization message 8 in a step 52 is received by means of the transceiver dedicated to the three-dimensional corporal FIG. 101 and the motor vehicle 102, respectively, then in a step 53 outputting a position information reflecting the position P is carried out in the motor vehicle 102. Displayed together with this position information in particular is the identification code ID and a corresponding user name, respectively. As well as a first message the user name may also be a part of the initialization message 8. FIG. 8 shows an exemplary embodiment of a position output by means of a display and operating device 104 in the motor vehicle 102 corresponding to the display and operating device. In the exemplary embodiment according to FIG. 8 the position information is carried out by means of an image of the vicinity of the motor vehicle 102 and a display of a map.

Furthermore, depicted in a step 54 is an input function 109 for sending a friendship request from the transceiver dedicated to the three-dimensional corporal FIG. 101 and the motor vehicle 102, respectively, to the transceiver dedicated to the three-dimensional corporal FIG. 1 and the motor vehicle 2, respectively. If a user confirms and accepts the input function 109, respectively, then in a step 55 a friendship request from the transceiver dedicated to the first three-dimensional corporal FIG. 101 and the motor vehicle 102, respectively, is transmitted.

When the corresponding friendship request from the transceiver dedicated to the three-dimensional corporal FIG. 1 and the motor vehicle 2, respectively, is received in a step 56, then in a step 57 this is indicated in motor vehicle 2 and an acceptance of the friendship request may be chosen. If the friendship request is accepted, this is transmitted to the transceiver dedicated to the three-dimensional corporal FIG. 101 and the motor vehicle 2, respectively, together with corresponding additional data and by means of sending of access data, respectively. If these access data are received in a step 58 this allows a user of the three-dimensional corporal FIG. 101 access to the user data corresponding to the three-dimensional corporal FIG. 1 in a step 59. Either by means of the friendship request or following the step 58 access data from the transceiver dedicated to the three-dimensional corporal FIG. 101 and the motor vehicle 102, respectively, is transmitted to the transceiver dedicated to the three-dimensional corporal FIG. 1 and the motor vehicle 2, respectively. By means of these access data the access to the personal data profile dedicated to the three-dimensional corporal FIG. 101 may be carried out via the Internet in a step 60.

It may also be provided for that only the steps 51 and 52 are allocated to the quadrants 71 and 72 and that the steps 53, 54, 55, 56, 57 and 58 are allocated to the quadrants 73 and 74, this is to mean in particular that the steps 53, 54, 55, 56, 57 and 58 may not necessarily be carried out in the motor vehicles 2 and 102, respectively, but may for example be carried out at the domestic PC. In this case the transmission is carried out via the Internet according to the steps 55 and 57, however, is not carried out from transceiver to transceiver. This is to mean that in this case for example the friendship request is not transferred from transceiver to transceiver but via the Internet.

It may be provided for that different personalities may be assigned to the three-dimensional corporal FIG. 1 so that the three-dimensional corporal FIG. 1 depending on personality reacts differently to certain situations and/or input and entries of a user, respectively. When the three-dimensional corporal FIG. 1 for example is programmed such that it comprises a cheerful personality it may be provided for that it tells jokes and anecdotes if the motor vehicle is caught in a traffic jam or is delayed. When the three-dimensional corporal FIG. 1 is supplied with a informative personality and is configured accordingly, respectively, it may be provided for that it outputs security recommendations which are based on the driving style or recommendations on how the fuel efficiency could be improved. In particular it is provided for that the access to corresponding user profiles is carried out via the website 40.

Figure 9:
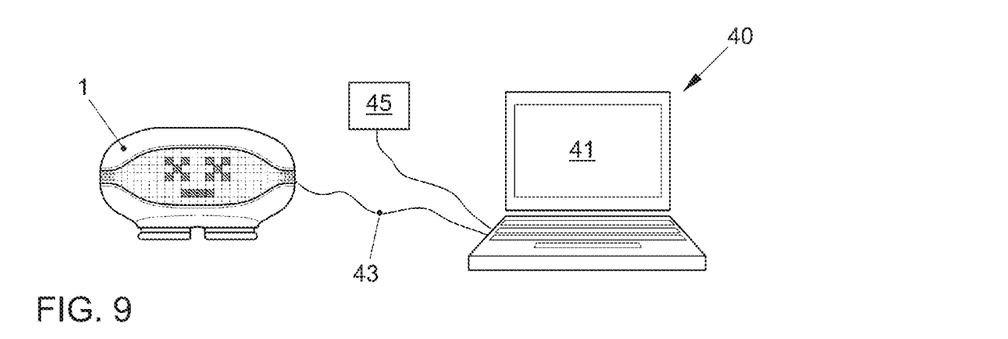
FIG. 9 shows a connection of a three-dimensional corporal figure according to FIG. 2 with a computer.
Figure 10:
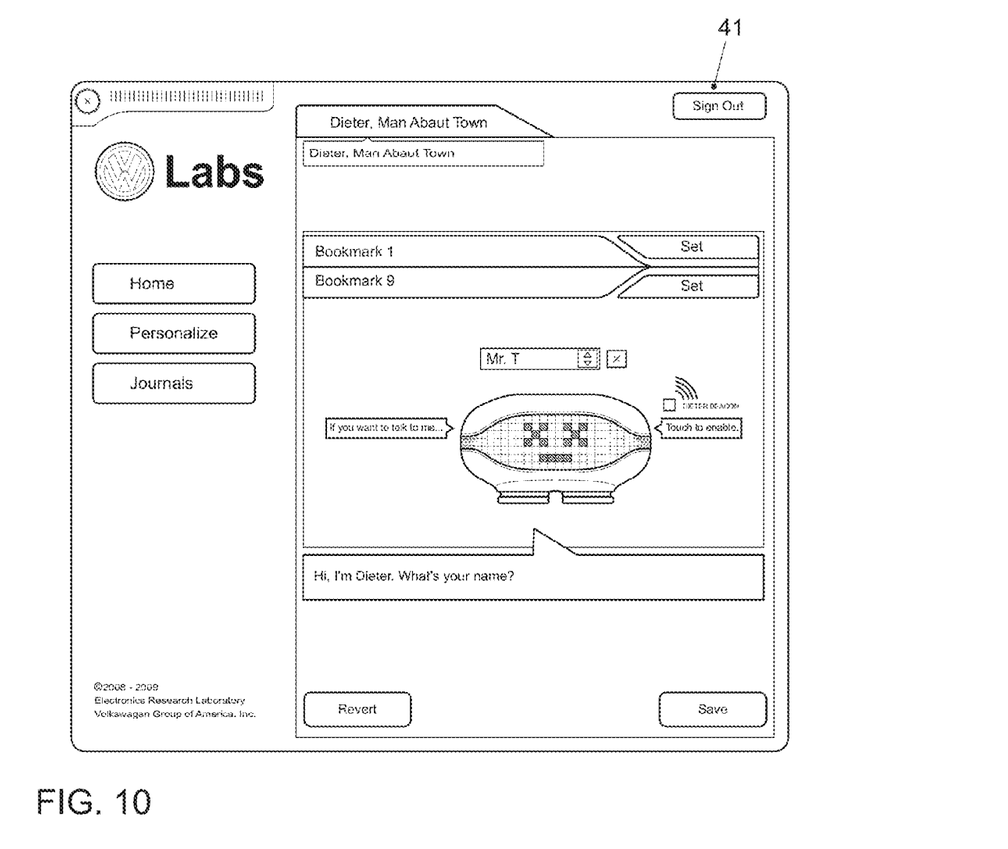
FIG. 10 shows an exemplary embodiment of a homepage for configuring a three-dimensional corporal figure according to FIG. 2.

In order to change the personality of the three-dimensional corporal figure it may be provided for that the three-dimensional corporal FIG. 1—as depicted in FIG. 9 in an exemplary manner—is connected to a PC 40, in particular by means of a USB cable 43 which also serves for energy supply. By means of the PC 40 it is feasible to select a number of predefined personalities via a website 45 or to create an own personality by means of the Internet interface. FIG. 10 shows a computer display 41 during a representation of an exemplary homepage for configuring the three-dimensional corporal FIG. 1.

It may also be provided for that the three-dimensional corporal FIG. 1 or the three-dimensional corporal FIG. 101 are not positioned in a motor vehicle but stationary, for example. Such a stationary positioned three-dimensional corporal figure may for example receive initialization messages from passing motor vehicles. Such a configuration may for example serve to solicit or to make available certain items. A stationary positioned corporal three-dimensional figure may also be used to make available traffic information, weather information or other relevant information. For example, it may also be provided for that by means of a stationary positioned three-dimensional figure a display panel is operated which is addressed by a driver using his/her name when he/she passes. In particular it may be provided for that transceivers which are positioned stationary not necessarily are used in three-dimensional corporal figures but also in other housings or integrated into other devices, for example.

REFERENCE NUMERALS 1, 101 three-dimensional corporal figure/avatar
2, 102 motor vehicle
3 dashboard
4, 104 display and operating device 5 clamping device
8 initialization message
10 control
11 touch sensitive area
12 microphone
13 loudspeaker
14 display
15 Bluetooth interface
15 acceleration sensors
17 navigation system
18 further sensors
19 USB interface
21 interface by means of which it may be communicated with other figures in a wireless manner
22, 23 pedestal
25 memory
30 display and operating control
31 bus system
32 interface
34 vehicle control device
35 navigation system
36 automatic climate control
37 infotainment system
38 sensors located in the vehicle
39 camera for recording the vicinity of the motor vehicle
40 computer
41 computer display
43 USB cable
45 website
51, 52, 53, 54,
55, 56, 57, 58,
59, 60 step
71, 72, 73, 74 quadrant
100 system for communicating between and with motor vehicles, respectively
109 input function
220, 230 salient

What is claimed is:

1. A method for communicating between motor vehicles, the method comprising the steps of:
    sending an initialization message by means of a first transceiver of a first portable three-dimensional corporal figure removably arranged in a first motor vehicle, the initialization message intended for direct receipt by a second transceiver of a second portable three-dimensional corporal figure removably arranged in a second motor vehicle, each of the first and second portable three-dimensional corporal figures being configured to provide visual and speech feedback to the passengers of the respective motor vehicle;
    wherein the initialization message comprises an identification code of the first transceiver and its geographic position;
    repeating the initialization message at least a plurality of times;
    directly receiving the initialization message by the second transceiver of the second portable three-dimensional corporal figure removably arranged in the second motor vehicle, such that the initialization message is communicated directly from the first transceiver of the first portable three-dimensional corporal figure to the second transceiver of the second portable three-dimensional corporal figure;
    the second portable three-dimensional corporal figure communicating the geographic position of the first transceiver to a display device integrated with the second motor vehicle via a wireless communication interface separate from the second transceiver that communicates with the first portable three-dimensional corporal figure; and
    displaying the geographic position of the first transceiver by the display device integrated with the second motor vehicle.

2. The method according to claim 1, the method further comprising the step of outputting an information message in the second portable three dimensional corporal figure arranged in the second motor vehicle, wherein the information message specifies that an initialization message of the transceiver arranged in the first motor vehicle first has been received.

3. The method according to claim 1, the method flintier comprising the step of offering an input function for sending a friendship request.

4. The method according to claim 3, the method further comprising the step of sending the friendship request.

5. The method according to claim 1, the method further comprising the step of sending a friendship request from the second transceiver to the first transceiver.

6. The method according to claim 1, the method further comprising the step of offering an input function in the second motor vehicle for sending a friendship request from the second transceiver to the first transceiver.

7. The method according to claim 6, the method further comprising the step of sending a friendship request from the second transceiver to the first transceiver.

8. The method according to claim 5, the method further comprising the step of receiving the friendship request by the first transceiver.

9. The method according to claim 8, the method further comprising the step of accepting the friendship request.

10. The method according to claim 9, the method further comprising the step of accessing a personal data profile dedicated to the second transceiver.

11. The method according to claim 9, the method further comprising the step of accessing a personal data profile dedicated to the first transceiver.

12. The method according to claim 4, the method further comprising the step of receiving the friendship request.

13. The method according to claim 12, the method further comprising the step of accepting the friendship request.

14. The method according to claim 13, the method further comprising the step of accessing a personal data profile dedicated to the second transceiver.

15. The method according to claim 1, the method further comprising the step of receiving the friendship request by the first transceiver.

16. The method according to claim 8, the method further comprising the step of accepting the friendship request.

17. The method according to claim 12, the method further comprising the step of accessing a personal data profile dedicated to the second transceiver.

18. A system for communicating between motor vehicles, the system comprising:
    a first transceiver of a first portable three-dimensional corporal figure removably arranged in a first motor vehicle for repeated sending of an initialization message directly to a second transceiver of a second portable three-dimensional corporal figure removably arranged in a second motor vehicle, each of the first and second portable three-dimensional corporal figures being configured to provide visual and speech feedback to the passengers of the respective motor vehicle;

wherein the initialization message comprises an identification code of the first transceiver and position information regarding the its geographic position of the first transceiver;

the second transceiver of a second portable three-dimensional corporal figure removably arranged in the second motor vehicle being configured to receive the initialization message directly from the first transceiver of the first portable three-dimensional corporal figure; and the second portable three-dimensional corporal figure including a wireless communication interface configured to communicate the position information of the first transceiver to a display device integrated with the second motor vehicle, such that the position information of the first transceiver is displayed by the display device integrated with the second motor vehicle, wherein the wireless communication interface of the second portable three-dimensional corporal figure for communicating with the display device of the second motor vehicle is separate from the second transceiver of the second portable three-dimensional corporal figure for communicating with the first portable three-dimensional corporal figure.

19. The system of claim 18, wherein the second portable three-dimensional corporal figure is further configured for outputting an input function for sending a friendship request from the second transceiver to the first transceiver.

20. The method according to claim 1, comprising the first motor vehicle recording a photographic image of a vicinity of the first motor vehicle, and wherein the initialization message transmitted by the first transceiver of the first portable three-dimensional corporal figure comprises the recorded photographic image of the vicinity of the first motor vehicle.

21. The system according to claim 18, wherein:

the first motor vehicle comprises a camera configured to record a photographic image of a vicinity of the first motor vehicle, and wherein the initialization message transmitted by the first transceiver of the first portable three-dimensional corporal figure comprises the recorded photographic image of the vicinity of the first motor vehicle.

* * * * *